United States Patent [19]

Ehrgott et al.

[11] 4,138,502
[45] Feb. 6, 1979

[54] METHOD OF PRODUCING A DARKENED FREEZE-DRIED COFFEE

[75] Inventors: Charles W. Ehrgott, Rumson; David C. Edwards, River Edge, both of N.J.

[73] Assignee: General Foods Corporation, White Plains, N.Y.

[21] Appl. No.: 485,854

[22] Filed: Jul. 17, 1974

Related U.S. Application Data

[63] Continuation of Ser. No. 421,019, Dec. 3, 1973, abandoned, which is a continuation of Ser. No. 79,340, Oct. 8, 1970, abandoned.

[51] Int. Cl.² ............................................... A23F 1/04
[52] U.S. Cl. ..................................... 426/385; 426/515
[58] Field of Search ....................... 426/385, 384, 515; 34/5

[56] References Cited

U.S. PATENT DOCUMENTS

| 2,509,681 | 5/1950 | Flosdorf | 426/385 |
| 3,244,529 | 4/1966 | Johnson et al. | 426/385 |
| 3,293,766 | 12/1966 | Togashi et al. | 426/242 X |
| 3,365,806 | 1/1968 | Pfluger et al. | 34/5 |
| 3,438,784 | 4/1969 | Clinton et al. | 426/385 |
| 3,443,961 | 5/1969 | Kaleda et al. | 426/385 |
| 3,556,818 | 1/1971 | Oldenkamp et al. | 426/385 |
| 3,573,060 | 3/1971 | Casten et al. | 426/385 |
| 3,619,204 | 11/1971 | Katz | 426/515 X |
| 3,653,929 | 4/1972 | Dwyer | 426/385 |

Primary Examiner—Robert Halper
Attorney, Agent, or Firm—Thomas R. Savoie; Bruno P. Struzzi

[57] ABSTRACT

The color of freeze dried coffee can be darkened by carefully controlling the pressure in the drying chamber during the first 1 to 5 hours of the drying cycle. By maintaining the pressure at between 350 to 650 microns of mercury for the specified time, a surface darkening is achieved without allowing the product to actually melt or puff. Thus, a high quality freeze dried coffee is obtained with a more desirable appearance.

1 Claim, No Drawings

METHOD OF PRODUCING A DARKENED FREEZE-DRIED COFFEE

This is a continuation, of application Ser. No. 421,019 now abandoned filed Dec. 3, 1973 which is a continuation of Application Ser. No. 79,340 now abandoned filed Oct. 8, 1970.

BACKGROUND OF THE INVENTION

This invention concerns a method of freeze drying frozen and granulated coffee extract in a manner which results in a desirable dark product appearance. More particularly, it pertains to controlling the vacuum chamber pressure during the initial half of the freeze drying cycle to obtain a darker colored product.

Freeze drying concerns the removal of water from frozen products via sublimation in a vacuum chamber. In prior art processes for freeze drying coffee extract the chamber pressure has typically been maintained at less than 300 microns of mercury, ($\mu$Hg.) and in many processes at less than 100$\mu$Hg. throughout the drying cycle. The process of this invention deliberately maintains a higher chamber pressure in the initial portion of the drying cycle as a means of darkening the final product color.

The importance of color in a freeze dried product has long been recognized and an object of many research investigations has been to obtain a dark freeze dried soluble coffee which resembles regular roasted and ground coffee.

Prior art processes such as those described in U.S. Pat. Nos. 3,399,061 and 3,443,963 have recognized the importance of controlling the freezing profile of coffee extract as a means of obtaining a dark colored product. The disadvantage of such prior art processes is that one is restricted to the use of large, costly freezing equipment in order to obtain the necessary degree of control over the freezing profile.

In U.S. Pat. No. 3,244,529, Johnson et al. describe a process wherein after a dry shell has been formed in the freeze drying chamber around the particles being dried, a specified percentage of the remaining frozen water is allowed to melt and refreeze in the latter part of the drying cycle, as a means of darkening the product color. The disadvantage of such a process is that the melting of the inner ice surfaces is generally associated with flavor degradation. Also, the process is difficult to control and may result in a totally puffed and unusable product. Furthermore, when the process is maintained under control the amount of color darkening achieved is minimal.

SUMMARY OF THE INVENTION

It has now been discovered that the color of freeze dried soluble coffee can be darkened by controlling the pressure in the drying chamber during the first 1-5 hours of the drying cycle. By maintaining the pressure at between about 350 to 650$\mu$Hg. for the specified period of time a surface darkening is achieved without allowing any of the inner frozen product to melt or puff. Thus, a high quality freeze dried coffee is obtained having a desirable appearance with no noticeable flavor effect.

While the specified pressure can be maintained throughout the drying cycle, the effect upon color has been determined as significant only in the initial $\frac{1}{4}$ to $\frac{1}{2}$ of the drying cycle. Thus, the full effect of the process of this invention can be achieved even with a low chamber pressure (such as those used standardly in the prior art process) during the latter part of the drying cycle.

As used in this invention coffee extract refers to the water solution of soluble coffee solids obtained in a commercial percolation operation wherein roasted and ground coffee is extracted with water. The roasted and ground coffee used to prepare the coffee extract may be decaffeinated or undecaffeinated coffee.

DESCRIPTION OF THE PREFERRED EMBODIMENT

In a typical freeze drying process roasted and ground coffee is extracted to obtain a coffee extract. The extract may then be subjected to further treatment such as aromatization or concentration prior to freezing. The coffee extracted is then frozen, typically in slab form on a continuous belt freezer. The frozen extract is then ground into pieces of a desired size and shape and the frozen particulate coffee extract is then placed in a vacuum chamber wherein it is freeze dried. In the vacuum chamber the chamber pressure is reduced to well below the tripple point for water, typically below 300$\mu$Hg. and frequently below 100$\mu$Hg. Heat is supplied to the frozen particles, generally by conduction and/or radiation at a rate which is insufficient to melt the frozen particles but is sufficient to supply the heat of sublimation to the frozen water.

The color of the final freeze dried coffee is dependent upon the type of coffee actually used in percolation, the concentration of the coffee extract being dried and most significantly the freezing profile to which the extract has been subjected. Rapid freezing will result in a light colored final freeze dried coffee product regardless of the initial type of coffee or extract concentration used. Freezing techniques wherein coffee extract is rapidly frozen have been developed to the point that they may be significantly more economical than the relatively slow freezing necessary on a belt freezer to obtain a final product color which resembles roasted and ground coffee. However, these newer freezing techniques cannot be utilized in the ordinary prior art freeze drying processes as it has been shown that the consumer prefers a product which resembles that of roasted and ground coffee in color.

In the process of this invention, it has been discovered that the color of the freeze dried coffee can be significantly darkened by maintaining the chamber pressure at from 350 to 650$\mu$Hg. during the initial 1-5 hours of the drying cycle. Little if any color change is observed by maintaining this higher pressure during the remainder of the drying cycle. A preferred pressure range is from about 400 to 500$\mu$Hg. Also, it is preferred to maintain the higher pressure for about $\frac{1}{4}$ to $\frac{1}{2}$ of the drying cycle. The pressure can be controlled by many standard techniques. When internal condensers are used in the drying chamber the pressure can be controlled by throttling the flow of refrigerant through the condenser. Pressure may also be controlled by the technique of throttling the vacuum exhaust line. Other standard techniques for controlling pressure are well known in the art. While utilizing the process of this invention the entire darkening effect is a surface effect. That is, the surface of the frozen particles tends to soften and shrink and it is believed that this denser surface causes the final dried particles to have a darker appearance. This slight surface shrinkage is in no way equivalent to a melting of the extract, said melting being associated with flavor degradation in a freeze drying process.

The process of this invention does tend to increase the density of the final product to a small degree. Therefore, it has been found desirable after grinding the frozen extract to remove the frozen fines prior to freeze drying. Fines may be removed by methods known in the prior art such as screening. It is generally desirable to remove those particles which pass through a U.S. 40 Mesh screen.

The advantages of the process of this invention will be shown in examples to follow wherein the color of the product is referred to. The color measurements as reported refer to readings obtained on a Photovolt Reflectance Meter. The specific unit was manufactured by Photovolt Company and is a Photoelectric Reflectance Unit, Model 610 utilizing a Model 610Y Search Unit. The initial unit is calibrated such that the reflectance from magnesium oxide reads 100% on a 0 - 100 scale. The subsequent color measurements of coffee are thus relative, but a color difference of from 1 - 2 units is detectable by the human eye.

The process of this invention will now be described in further detail by reference to the following examples:

EXAMPLE I

Coffee extract at a 35% concentration (% solids by weight of the extract) was slowly frozen on a continuous freeze belt to obtain a solid frozen slab. The slab was ground and divided into three samples for freeze drying. Sample 1 was dried at a pressure of from 100 to 150μHg. for the entire 9 hour drying cycle. Sample 2 was dried at a pressure of 380 to 420μHg. and sample 3 was dried at 450μHg. The color of the final dried product for samples 1, 2, and 3 were 31, 29, and 28 respectively. A color of 31 is considered a reasonably desirable color for a freeze dried coffee. A color of 28 is considered excellent. It is readily apparent that a gradual darkening from desirable to excellent was attained as the drying pressure was increased.

EXAMPLE II

Extract was rapidly frozen and the frozen slabs ground and divided into two samples. Sample 1 was dried at from 100 to 150μHg. for 9 hours and sample 2 was dried at 490μHg. The color of the dry product from sample 1 was 48.5, a very light and undesirable color. The color of sample 2 was 36.0, a color which is lighter than desirable but tolerable as a final product color.

EXAMPLE III

The process of example 2 was repeated but an 8 hour drying cycle was used. Also, in run number 1 the pressure was deliberately raised from 150 Hg. to 490μHg. for the latter half of the drying cycle. In run number 2 the pressure was deliberately reduced from 490μHg. to 100μHg. during the latter half of the drying cycle. The color of the final product from run number 1 was 49.0 while the color from run number 2 was 38.0. Thus, it is apparent that the bulk of the improvement in color is obtained in the initial portion of the drying cycle.

EXAMPLE IV

Slowly frozen extract prepared as in Example I was divided into 5 batches and freeze dried at varying pressures. The following results were obtained:

| Run Number | Chamber Pressure (μHg.) | Product Color |
|---|---|---|
| 1 | 250 | 32.5 |
| 2 | 320 | 32.5 |
| 3 | 380 | 30.0 |
| 4 | 450 | 30.0 |
| 5 | 520 | 28.0 |

From the foregoing table it is readily apparent that a gradual decrease in product color is obtained as the chamber pressure is increased.

EXAMPLE V

Frozen and ground coffee was prepared as in Example I and divided into 6 batches for freeze drying runs. The duration of the drying cycle was seven hours. The following table summarizes the pressure conditions during the drying cycle and color of the final product. Where not indicated the pressure in the drying chamber was less than 280μHg.

| Run Number | Chamber Pressure (μHg.) | Time at High Pressure | Product Color |
|---|---|---|---|
| 1 | 270 | Initial 10 mins | 33.0 |
| 2 | 475 | First hour | 31.5 |
| 3 | 475 | First 2 hours | 30.5 |
| 4 | 475 | First 3 hours | 29.0 |
| 5 | 475 | Last 4 hours | 33.0 |
| 6 | 475 | Entire run | 30.0 |

It is readily apparent that essentially no color darkening was achieved in run number 5 (as compared to run number 1) where the pressure was maintained at a high level only during the latter portion of the drying cycle. It is also apparent that there was a gradual darkening as the time at a high pressure during the initial half of the drying cycle was increased. Note, that maintaining the pressure at a high level in run number 6 for the entire run did not result in any significant change as compared to the darkening achieved in run number 4 where the pressure was maintained at a high level for only 3 of the 7 hours.

EXAMPLE VI

It should be noted that in all of the foregoing examples the darkened product had an increased density as compared to the product dried at a low pressure. A run was made wherein frozen granules were prepared as in Example I. The ground material was subjected to a separation operation wherein 10% of the product having a particle size of less than a 40 Mesh screen was separated out by air classification. The bulk (90%) of the product was then freeze dried using an elevated pressure of about 400 microns during the initial half of the drying cycle. As in example I, the color darkening was achieved. In addition, it was found that there was no significant change in density between the color darkened sample and the unscreened, undarkened control.

The foregoing examples were for illustrative purposes only and the scope of this invention is intended to be limited only by the appended claims.

What is claimed is:

1. A method for obtaining darkened freeze-dried coffee comprising the steps of:
    (a) rapidly freezing coffee extract
    (b) grinding the frozen extract and
    (c) drying the frozen ground extract in a vacuum chamber, the pressure in the vacuum chamber being maintained and controlled at from 400 to 500 microns of mercury for the initial one to five hours of the drying cycle, comprising from ¼ to ½ of the drying cycle, in order to achieve a surface darkening without allowing any of the inner frozen product to melt or puff, and then deliberately reducing the pressure to below 300 microns of mercury for the remainder of the drying cycle.

* * * * *